United States Patent Office 3,307,903
Patented Mar. 7, 1967

3,307,903
PROCESS FOR THE PREPARATION OF HIGH
PURITY AMMONIUM PERCHLORATE
Fabrizio Lazari, Milan, Italy, assignor to Montecatini
Edison S.p.A., Milan, Italy
No Drawing. Filed Jan. 20, 1964, Ser. No. 338,630
Claims priority, application Italy, Jan. 30, 1963,
1,881/63
8 Claims. (Cl. 23—85)

My invention relates to a process for making ammonium perchlorate of very high purity and with a predetermined granulometry.

Methods for preparing ammonium perchlorate are known. These methods are based on double exchange reactions between aqueous solutions of perchlorates of alkaline and alkaline-earth metals and aqueous solutions of ammonium chloride or sulfate. They utilize the different solubility between ammonium perchlorate and chlorides or sulfates of the alkaline or alkaline-earth metals to obtain the final product.

Methods based on the reaction between alkaline perchlorates, acids and ammonia are also known.

A disadvantage common to these processes is that ammonium perchlorate is obtained in a solution containing other salts which are more or less water-soluble, so that the pure product is obtainable only by means of burdensome operations using fractioned crystallization methods.

Processes for preparing perchlorate acid and thereafter obtaining ammonium perchlorate by neutralization with ammonia, are also known. In these processes, however, peculiar requirements relating to the reactants must be satisfied and allowance must be made for the safety hazards involved by the use of perchloric acid. When perchloric acid is not pure or, if it is pure but has a very high concentration, it constitutes a highly reactant material.

Besides the chemical characteristics of ammonium perchlorate, the crystalline quality is involved because the granular texture of the salt must often correspond to predetermined values to allow the employment of ammonium perchlorate in special applications such as, for example, the preparation of composite propellants.

I have now found a process for making ammonium perchlorate of high purity and predetermined granulometry. My invention has as its object an economical process, which eliminates the safety hazards mentioned above.

According to my invention, a concentrated solution of sodium perchlorate, as it originates from electrolytic oxidation, is treated with barium hydroxide to precipitate the chromate ion present from the catalyst used in the electrolytic oxidation. The filtered solution is then placed in a boiler and concentrated sulfuric acid is added. It is heated under vacuum, and a water and perchloric acid mixture is distilled under reduced pressure by utilizing the particular equilibrium curve between the gaseous and the liquid phase of the perchloric acid aqueous solutions. The composition of the mixture, depending on the residual pressure in the reactor, hovers around 65% perchloric acid, the remainder being water.

By operating as above, the perchloric acir solution contains only traces of sulfuric acid, in the order of a few parts per million.

The neutralization of perchloric acid with gaseous ammonia is carried out in a reactor under atmospheric pressure wherein the aqueous solution of perchloric acid, distilled as above, is introduced. A stoichiometric amount of ammonia is added, and a saturated ammonium perchlorate solution, at $T_0$ temperature, is recycled from the crystallization vessel. A saturated ammonium perchlorate solution at the temperature $T_1$ is obtained. $T_1$ and $T_0$ are selected in order to produce the predetermined granulometry spectrum with $T_1$ being greater than $T_0$.

The quantity of heat released by the neutralization reaction of perchloric acid in aqueous solution with gaseous ammonia is not sufficient generally for evaporating all the water introduced into the cycle with perchloric acid, if perchloric acid solutions with concentrations of about 65% are employed. In such case the heat of reaction is integrated with other heat supplied to the saturated ammonium perchlorate solution at temperature $T_1$, introduced into the crystallization vessel at temperature $T_0$.

The saturated solution, which is in the reactor at temperature $T_1$, is gradually introduced into the crystallization vessel which works under such reduced pressure as to allow the solution to boil at temperature $T_0$. Under these conditions the solution passes from temperature $T_1$ to temperature $T_0$, while losing the water, accompanying the acid admitted into the reactor, by evaporation. This loss of water is at the expense of the heat of neutralization produced and integrated as mentioned above. Simultaneously, as much ammonium perchlorate as is formed in the reaction is settled.

The recycle solution returns to the same mass, concentration and temperature value that it possessed when it was introduced into the reactor, and the crystallized salt shows the predetermined granulometry.

In summation my invention relates to a process for the preparation of very high purity ammonium perchlorate with a predetermined granulometry, comprising the steps of (a) reacting an aqueous solution of sodium perchlorate with an excess of concentrated sulphuric acid wherein the molar ratio of $H_2SO_4/NaClO_4$ is between 2 and 4.3 to produce a 50 to 72% pure perchloric acid solution; (b) distilling the perchloric acid under reduced pressure of between 15 and 400 mm. Hg, and at a temperature of 170° C.; (c) neutralizing the resulting aqueous solution of perchloric acid with gaseous ammonia in a reactor operating under atmospheric pressure in the presence of an aqueous ammonium perchlorate solution saturated at 40° C. in crystallization stage, so that the whole of this solution consisting of formed salt and water introduced with the acid, yields a solution of ammonium perchlorate saturated at a temperature between 40° and 90° C.; (d) introducing this solution into a crystallization vessel; and (e) cooling said solution saturated with ammonium perchlorate to a temperature between 0° and 40° C. under a pressure of about 50 mm. Hg, thus obtaining crystalline ammonium perchlorate having a titre of 99.9% $NH_4ClO_4$ with a predetermined granulometry and a saturated solution of ammonium perchlorate which is recycled to the neutralization stage.

The following examples serve only to further illustrate the invention without limiting the scope thereof.

*Example 1*

515 cubic centimeters of sodium perchlorate solution purified from the occasionally occurring chromates, by addition of barium hydroxide and successive filtration (said sodium perchlorate solution containing 356 grams equal to about 3 salt moles) and 942 grams of concentrated sulfuric acid (equal to 9.6 moles) were introduced into a flask equipped with thermometer, a tube for the introduction of the reactants, a tube leading to a cooling source, followed by a collector. The molar ratio $H_2SO_4/NaClO_4$ was about 3.2. By vacuum through the collector, the pressure in the apparatus is brought to 203 mm. Hg and the flask was heated to distill perchloric acid produced. During the initial phase of the process, the thermometer exposed to the vapor remained at about 70° C., and almost pure water was distilled. After almost 2 hours, the temperature of the vapor rose to about 170° C. and within an hour a solution of perchloric acid with constant concentration of about 65% was distilled. When 410 g. of 65% perchloric acid contains 266 g. of acid were collected the distillation stopped.

The reaction yield was about 92% of theoretical. Thereafter, the perchloric acid was employed in the preparation of ammonium perchlorate as follows. 155 g. of 65% solution containing 100.45 g. (one mole perchloric acid), was introduced into a reactor operating under ambient pressure, wherein 935 g. of saturated solution at 25° C. of ammonium perchlorate recycled from the crystallization vessel were introduced.

17 g. (one mole) $NH_3$, were introduced to neutralize the acid, producing 117.45 g. (one mole) $NH_4ClO_4$. In the reaction 23.5 kcal. were released. With this heat, the mass comprising the saturated solution at $T_0$ from the crystallization vessel, the salt formed in the reaction and the water accompanying the perchloric acid, must be brought to the temperature at which the saturated solution is obtained. With the amounts set out in the example, the temperature at which the solution was saturated is 50° C. The amount thereof was 1107 g. of which 27.5%, i.e. 304.5 g., was perchlorate. The quantity of heat, which was necessary to bring this mass from 25° C. to 50° C. was about 21.1 kcal. Thus, the reaction heat proves to be in excess of about 10% and compensates, thereby, the unavoidable heat loss by the apparatus.

The saturated solution at 50° C. was introduced into the crystallization vessel wherein the pressure has been reduced to about 50 mm. Hg in order to have the solution boiling at 25° C. The boiling solution, saturated at 50° C., concentrates and cools to 25° C.

Boiling continued until evaporation of 54.5 g. of water, introduced in the aqueous solution of perchloric acid, ensued. The heat necessary during this phase was 31.7 kcal. and, since the solution introduced into the crystallization vessel, saturated at 50° C., may give back only 21.1 thereof, the difference, 10.6 kcal. must be supplied from an outside source.

With the evaporation of all the water introduced into the cycle, the corresponding gram mole of ammonium perchlorate crystallized into the predetermined granulometry was separated, and the mother liquors at 25° C. were recycled.

The salt obtained under the above conditions had the following granular size:

| Sieves No. | Tyler set mesh width in $\mu$ | Passing percent |
|---|---|---|
| 325 | 43 | 0 |
| 150 | 104 | 12.5 |
| 100 | 147 | 45 |
| 48 | 295 | 96.5 |
| 16 | 991 | 100 |

Different granular sizes may be obtained by varying either the reactor and the crystallization vessel temperatures, or only one of them, or the degree of saturation of the solution introduced into the crystallization vessel.

The collected and dried salt when analyzed showed the following results:

| | |
|---|---|
| Chlorates, as $NaClO_3$ | Traces |
| Chlorides | Absent |
| Titer in $NH_4ClO_4$ percent | 99.90 |
| Methyl orange reaction | Neutral |
| Water insoluble percent | 0.004 |
| Ashes treated with $H_2SO_4$ | Traces |
| Sulfates, as $(NH_4)_2SO_4$ | Absent |
| Alkaline metals, besides $NH_4$ | Absent |

*Example 2*

The perchloric acid preparation was carried out while employing the same amounts of reactants as in Example 1, but working at 300 mm. Hg pressure.

The initial phase lasts about 5 hours, and almost pure water was collected. The second phase lasts 3 hours and 295 g. of perchloric acid solution at 52% are collected, with a yield of about 52.5% of theoretical.

*Example 3*

The perchloric acid preparation was carried out by using the same amounts of reactants as in Examples 1 and 2, but the distillation was carried out under 90 mm. Hg. In the initial phase almost pure water was distilled, while in the second phase 450 g. of 59% perchloric acid solution were distilled with a yield of 91.5% of theoretical.

*Example 4*

The working conditions are the same as in Example 1, but the molar ratio $H_2SO_4/NaClO_4$ was 2.

The reaction was carried out as in Example 1; however, in the second phase 237 g. of 55% perchloric acid solution were collected with a yield of about 45% on the theoretical amount.

*Example 5*

The working conditions were the same as of Example 1, but the molar ratio $H_2SO_4/NaClO_4$ was 4.3.

The reaction was carried out as in Example 1; however, in the second phase 438 g. of 56% perchloric acid solution were collected with a yield of about 84% on the theoretical amount.

*Example 6*

The conditions were as in Example 1, except that in the reactor the 65% aqueous solution of perchloric acid and the corresponding amounts of anhydrous ammonia and of saturated solution of ammonium perchlorate coming from the crystallization vessel, were introduced in a continuous way while dosing them suitably. The mixture obtained was extracted continuously in such an amount as to maintain the contents of the reactor constant. The mixture taken out from the reactor was recycled continuously into the crystallization vessel. At the same time the crystallized salt and the saturated solution of ammonium perchlorate to be recycled to the reactor, were taken out continuously.

The characteristics of the product obtained through continuous operation were identical with the characteristics of the salt obtained while working batchwise as in Example 1. The energy balance was kept also substantially equal.

I claim:
1. A process for the preparation of very high purity ammonium perchlorate with a predetermined granulometry, comprising the steps of (a) reacting an aqueous solution of sodium perchlorate with an excess of concentrated sulphuric acid wherein the molar ratio of $H_2SO_4/NaClO_4$ is between 2 and 4.3 to produce a 50 to 72% pure perchloric acid solution; (b) distilling the perchloric acid under reduced pressure of between 15 and 400 mm. Hg, and at a temperature of 170° C.; (c) neutralizing the resulting aqueous solution of perchloric acid with gaseous ammonia in a reactor operating under atmospheric pressure in the presence of added aqueous ammonium perchlorate solution saturated at 40° C. in crystallization stage, so that the whole of this solution consisting of formed ammonium perchlorate and water introduced with the acid, yields a solution of ammonium perchlorate saturated at a temperature between 40° and 90° C.; (d) introducing this solution into a crystallization vessel; and (e) cooling said solution saturated with ammonium perchlorate to a temperature between 0° and 40° C. under a pressure of about 50 mm. Hg, thus ob- taining crystalline ammonium perchlorate having a titre of 99.9% $NH_4ClO_4$ with a predetermined granulometry and a saturated solution of ammonium perchlorate which is recycled to the neutralization stage.

2. The process according to claim 1, wherein the pure perchloric acid is prepared in a concentration of about 65%.

3. The process according to claim 1, wherein the molar ratio of $H_2SO_4/NaClO_4$ is 3.2.

4. The process according to claim 1, wherein the distillation temperature is about 200 mm. Hg.

5. The process according to claim 1, wherein the aqueous ammonium perchlorate solution within the reactor during the neutralization stage is at about 25° C.

6. The process according to claim 1, wherein a solution of ammonium perchlorate saturated at 50° C. is formed.

7. The process of claim 1, wherein the saturated solution of ammonium perchlorate is cooled to 25° C.

8. A process for the preparation of very high purity ammonium perchlorate which comprises (a) reacting an aqueous solution of sodium perchlorate and an excess of concentrated sulphuric acid, the molar ratio $$H_2SO_4/NaClO_4$$

is about 3.2 to form about a 65% perchloric acid solution; (b) distilling the perchloric acid at a pressure of about 200 mm. Hg and at a temperature of 170° C.; (c) neutralizing the resulting aqueous solution of perchloric acid with gaseous ammonia in a reactor operating under atmospheric pressure in the presence of an added aqueous solution of ammonium perchlorate, saturated at 25° C., from a crystallization stage, so that the whole of this solution consisting of formed ammonium perchlorate and water introduced with the acid, yields an ammonium perchlorate solution saturated at 50° C.; (d) introducing this solution into a crystallization vessel; and (e) cooling the ammonium perchlorate saturated to 25° C. under a pressure of about 50 mm. Hg, thus obtaining crystalline ammonium perchlorate having a titre of 99.9% $NH_4ClO_4$ and a saturated solution of ammonium perchlorate which is recycled to the neutralization stage.

References Cited by the Examiner

UNITED STATES PATENTS

| | | | |
|---|---|---|---|
| 2,392,861 | 1/1946 | Pernert | 23—152 |
| 2,739,873 | 3/1956 | Schumacher | 23—85 |
| 3,218,121 | 11/1965 | Tufts | 23—85 |

OSCAR R. VERTIZ, *Primary Examiner.*

EDWARD STERN, *Examiner.*